US010010896B2

(12) United States Patent
Kraus

(10) Patent No.: US 10,010,896 B2
(45) Date of Patent: Jul. 3, 2018

(54) DISPENSER PUMP AND METHOD FOR OPERATING A DISPENSER PUMP

(71) Applicant: KAO GERMANY GMBH, Darmstadt (DE)

(72) Inventor: Sebastian Kraus, Darmstadt (DE)

(73) Assignee: KAO GERMANY GMBH, Darmstadt (DE)

( * ) Notice: Subject to any disclaimer, the term of this patent is extended or adjusted under 35 U.S.C. 154(b) by 0 days.

(21) Appl. No.: 15/257,148

(22) Filed: Sep. 6, 2016

(65) Prior Publication Data

US 2017/0157631 A1 Jun. 8, 2017

(30) Foreign Application Priority Data

Dec. 3, 2015 (EP) .................................... 15197785

(51) Int. Cl.

| | |
|---|---|
| ***B67B 7/00*** | (2006.01) |
| ***G01F 11/00*** | (2006.01) |
| ***B65D 88/54*** | (2006.01) |
| ***B05B 11/06*** | (2006.01) |
| ***B05B 11/00*** | (2006.01) |
| ***B05B 15/00*** | (2018.01) |
| ***B05B 15/30*** | (2018.01) |

(52) U.S. Cl.

CPC ...... *B05B 11/3035* (2013.01); *B05B 11/3001* (2013.01); *B05B 11/3074* (2013.01); *B05B 11/3077* (2013.01); *B05B 15/005* (2013.01); *B05B 15/30* (2018.02)

(58) Field of Classification Search

CPC ............. B05B 11/3035; B05B 11/3001; B05B 11/3074

USPC ....... 222/1, 321.1, 321.6, 321.7, 321.8, 340, 222/633

See application file for complete search history.

(56) References Cited

U.S. PATENT DOCUMENTS 3,452,905 A * 7/1969 Micallef ............. B05B 11/3028 222/207
4,220,264 A * 9/1980 Gamadia ............... B05B 9/0883 222/207
4,732,549 A * 3/1988 von Schuckmann ...... B05B 11/3035 222/153.13
5,363,993 A * 11/1994 Mascitelli ........... B05B 11/0013 222/153.09
5,462,208 A * 10/1995 Stahley ................ B05B 7/0037 222/190

(Continued)

*Primary Examiner* — Vishal Pancholi
(74) *Attorney, Agent, or Firm* — Norris McLaughlin & Marcus, P.A.

(57) ABSTRACT

Dispenser pump for pumping reservoir fluid to a dispenser head, has a dip tube to insert into the fluid, a cylinder housing connected with the dip tube, a piston pipe guided in longitudinal direction by the cylinder housing for pumping the fluid from the dip tube to the dispenser head, wherein the piston pipe comprises a connecting area for connecting the dispenser head to the piston pipe, a top part connected with the piston pipe, a bottom part connected with the cylinder housing and a spring bellow for pushing the piston pipe in a direction outwards the cylinder housing, wherein a lower axial end of the spring bellow is connected with the bottom part via a lower retainer ring located inside the spring bellow and/or a higher axial end of the spring bellow is connected with the top part via a higher retainer ring located inside the spring bellow.

14 Claims, 5 Drawing Sheets

(56) References Cited

U.S. PATENT DOCUMENTS

| | | | | | |
|---|---|---|---|---|---|
| 5,518,147 | A * | 5/1996 | Peterson | B05B 11/3035 222/153.07 |
| 6,478,197 | B2 * | 11/2002 | Bethune | B05B 11/3042 222/321.7 |
| 6,755,327 | B1 * | 6/2004 | Hazard | B05B 11/3035 222/209 |
| 8,616,414 | B2 * | 12/2013 | Ciavarella | B05B 7/0037 222/1 |
| 2009/0206109 | A1 * | 8/2009 | Santagiuliana | B05B 11/3053 222/190 |

* cited by examiner

DISPENSER PUMP AND METHOD FOR OPERATING A DISPENSER PUMP

BACKGROUND OF THE INVENTION

The invention relates to a dispenser pump and a method for operating a dispenser pump, by means of which a fluid can be pumped from a reservoir upwards to a dispenser head, particularly for applying cosmetic products like hair care products.

From WO 96/28257 a dispenser with a dispenser pump is known comprising a dip tube and a piston pipe for pumping a liquid into a channel of a housing and from there through the piston to a chamber of a dispenser head via a valve. From the chamber of the dispenser head the liquid can be dispensed via a further valve of the dispenser head. The dispenser head can be pushed down for pumping the liquid against the spring force of a harmonica bellow which can push the dispenser head back in its starting position. The harmonica bellow is connected with the dispenser head and an intermediate part by which the housing can be clamped between a bottle and the intermediate part screwed with the bottle.

From EP 1 539 365 A1 a dispenser head is known comprising a lower piece to be connected to a pump and a head part for providing an outlet, wherein the head part is guided at the lower piece in axial direction. The head part and the lower piece are connected via a tubular bellow bordering a discharge channel for discharging a fluid from the lower piece via the bellow and the head part to the outlet. The tubular bellow is pressed on tubular parts of the head part and the lower piece. When the head part is pressed towards the lower part against a spring force of the bellow the bellow unrolls along a conical part of the lower piece.

There is a permanent need for reducing the manufacturing costs of a dispenser used for applying cosmetic products like hair care products.

SUMMARY OF THE INVENTION

It is an object of the invention providing measures enabling a cost efficient manufacturing of a dispenser with a high life time which may be particularly used for applying cosmetic products like hair care products.

An aspect of the invention is directed to a dispenser pump for pumping a fluid from a reservoir to a dispenser head, comprising a dip tube for being inserted into the fluid located inside the reservoir, a cylinder housing connected with the dip tube, a piston pipe guided in longitudinal direction by the cylinder housing for pumping the fluid from the dip tube via the cylinder housing to the dispenser head, wherein the piston pipe comprises a connecting area for connecting the dispenser head to the piston pipe, a top part connected with the piston pipe, a bottom part connected with the cylinder housing and a spring bellow for pushing the piston pipe in a direction outwards the cylinder housing, wherein a lower axial end of the spring bellow is connected with the bottom part via a lower retainer ring located inside the spring bellow and/or a higher axial end of the spring bellow is connected with the top part via a higher retainer ring located inside the spring bellow.

Due to the retainer ring(s) the spring below may be nondetachably connected to the bottom part and/or the top part. The lower retainer ring or the higher retainer ring may comprise an insertion chamfer for inserting the respective retainer ring into a corresponding connection opening of the spring bellow. The chamfer of the respective retainer ring enables a fast and easy connection be pressing the spring bellow onto the corresponding retainer ring. The surface of the retainer ring contacting the wall of the spring bellow surrounding the connection opening may be flat and does not comprise a chamfer. The retainer ring may retain the spring bellow for providing a nondetachable connection, wherein at the same time the spring bellow may be easily connected particularly due to the elasticity of the material of the spring bellow. Due to the elasticity of the spring bellow, the retainer ring may be even inserted into the connection opening easily when the respective retainer ring comprises a quite large diameter. This leads to an even more secure nondetachable connection. Particularly it is not necessary providing a further connection means, like an adhesive or the like, for fixing the spring bellow to the bottom plate and/or to the top plate. The retainer ring enables a fast, easy and secure connection of the spring bellow at low mounting costs and without the need of further connection means so that a cost efficient manufacturing of a dispenser with a high life time is enabled which may be particularly used for applying cosmetic products like hair care products.

Due to the top part connected with the piston pipe and the bottom part connected with cylinder housing the particularly ball- or bell-shaped spring bellow may be arranged at least partially on a significant larger diameter than the piston pipe and the cylinder housing. Particularly the spring bellow does not need having a conical shape for fitting one part of the spring bellow into a dispenser head. This particularly facilitates providing a simplified design for the spring bellow for providing a suitable spring characteristic. Particularly the spring bellow is not designed like a harmonica but can be designed as a part of an elastic hollow ball, bell or the like. The extension of the top part and the bottom part in a radial direction orthogonal to the longitudinal direction can be easily adjusted to the design needs of the spring bellow without affecting other parts of the dispenser pump. Further the spring bellow can be located significantly spaced in radial direction to the piston pipe and the cylinder housing over a significant part of its height in longitudinal direction so that it can be safeguarded that the spring bellow does not come into contact with the pumped fluid. Thus, it is not necessary choosing a material for the spring bellow which cannot be impaired, for instance by corrosion, by the pumped fluid. The pump functionality of the dispenser pump can be realized without the dispenser head. The dispenser pump is designed as an open system which can be applied for different dispenser heads. Thus, the dispenser pump can be easily used for different dispensers with different dispenser heads so that different dispensers may comprise the same design of the dispenser pump. Due to the enabled mass production of the dispenser pump the manufacturing cost for the dispensers may be reduced. Further it is possible designing the top part as an actuator means, by which a user may apply a force for pressing the piston pipe into the cylinder housing. In addition or in the alternate a dispenser head connected with the piston pipe via a connecting area of the piston pipe or the top part may be used as the actuator means. The dispenser pump provides different possibilities of actuating the dispenser pump so that a high flexibility for using the dispenser pump in different types of dispensers is given. Particularly the spring bellow is only fixed to the top part or the bottom via its corresponding retainer ring and rests only on the other part, namely the bottom part or the top part, so that a contact area of the spring bellow to the other part changes when the spring bellow is compressed between the top part and the bottom part. Since the spring bellow has to be only fixed to the top part or the bottom part a simplified and cost efficient design is provided leading to a cost efficient manufacturing of a dispenser which may be particularly used for applying cosmetic products like hair care products.

When the piston pipe is moved from its minimum inserted position in the cylinder housing towards its maximum inserted position in the cylinder housing the spring bellow is elastically compressed between the top part and the bottom part. The spring bellow may perform an elastic deformation like an elastic spherical ball being compressed between two even parts, wherein the spring bellow particularly may be designed like an elastic spherical ball or bell with a cut away part at its higher axial end for contacting the top part or being fixed with the top part and/or with a cut away part at its lower axial end for leading the piston pipe through the spring bellow. When the spring bellow is compressed between the top part and the bottom part, one axial end of the spring bellow is elastically deformed towards the interior of the spring bellow while the surrounding part of the spring bellow unrolls along the contact area. This means that in radial view a part of the spring bellow radially inwards to the contact area and a part of the spring bellow radially outwards to the contact area overlaps each other at least in the maximum inserted position of the piston pipe. A part of the spring bellow may evade into the interior of the spring bellow. Due to this elastic behavior of the spring bellow the spring bellow comprises a natural behavior of being bended outwards when compressed during the movement of the piston pipe from the minimum inserted position towards the maximum inserted position. Even when a user applies a force for pressing the piston pipe into the cylinder housing, which is orientated not in longitudinal direction but inclined to the longitudinal direction, it is prevented that the spring bellow may be bended radially inward at a part of its circumference. It is safeguarded that the spring bellow bends only radially outwards. Particularly the outer diameter of the contact area in the minimum inserted position is quite low. Due to this relative movement of the elastic deformation of the spring bellow relative to the part with the rolling contact, particularly the bottom part, friction effects between the spring bellow and the bottom part may be reduced so that mainly no friction force occurs which could lead to a bending of the spring bellow radially inwards. A mainly symmetric bending behavior of the spring bellow even in the case of a compression force inclined with respect to the longitudinal direction can be ensured. This leads to an easy and smooth movement of the piston pipe when a user uses the dispenser pump. The spring force distribution of the spring bellow may be very even. Further the forces at the beginning of the movement of the piston pipe are very close to the forces at the maximum inserted position. Due to a kind of rolling movement of the spring bellow particularly over the bottom part, the spring bellow does not block a further movement of the piston pipe towards the maximum inserted position by a significantly increasing spring force but may elastically evade so that the spring force provided by the spring bellow increases only slightly, if so at all, during the movement of the piston pipe towards the maximum inserted position. The use of the dispenser pump may be more convenient for a user.

The spring bellow may be fixed with the one part, particularly the bottom part, by means of the retainer ring and be in rolling contact via the contact area with this other part, where the spring bellow is fixed to. In the following the invention is explained with reference to an embodiment wherein the spring bellow is fixed with the bottom part by means of the retainer ring and in rolling contact with the bottom part, wherein all features applies mutatis mutandis for the embodiment wherein the wherein the spring bellow is fixed with the top part by means of the retainer ring and in rolling contact with the top part. Particularly the spring bellow may be fixed to the top part or bottom part, where no rolling contact takes place, by means of an additional retainer ring. Preferably a rolling contact takes place only at one part, namely only at the bottom part or at the top part.

The dip tube may be made from a rigid or flexible material and is particularly designed reaching to a very low position inside the reservoir, particularly a deepening at the bottom of a bottle defining the reservoir. The dispenser pump may be connected with the bottle, wherein the reservoir of the bottle may be filled with the fluid particularly up to the level of the bottom part. The bottom part may close an opening of the bottle. The piston pipe and the cylinder housing may constitute a pump. When the piston pipe is pushed into the cylinder housing an increasing pressure may be provided, wherein when the piston pipe is pulled away from the cylinder housing a decreasing pressure, particularly a negative pressure, is provided. Due to the negative pressure fluid may be sucked into the cylinder housing from the reservoir and delivered to the dispenser head at increasing positive pressure. Particularly the fluid is pumped via the piston pipe. The cylinder housing and/or the piston pipe may comprise a suitable valve, particularly one-way valve, for safeguarding the intended pump direction. The connecting area of the piston pipe can be utilized for connecting the dispenser head or a different device with the piston pipe in a manner that this part is in fluid communication with the dip tube. The top part and/or the bottom part is particularly arranged orthogonal to the longitudinal direction. Preferably the top part is connected to or one-piece with a cover part covering the spring bellow radially outwards. The cover part may be mainly tubular.

Particularly the cover part covers the whole height of the spring bellow even in the minimum inserted position of the piston pipe in the cylinder housing. The spring bellow is particularly compressed when the piston pipe is pushed into the cylinder housing. In this inserted position of the piston pipe in the cylinder housing the top part may be nearer to the bottom part than in a lesser inserted position of the piston pipe in the cylinder housing. The spring bellow may provide a spring force pressing the piston pipe out of the cylinder head until the minimum inserted position of the piston pipe in the cylinder housing is reached. The corresponding spring force may be provided by compressing the spring bellow, particularly by elastically deforming an elastic material of the spring bellow.

Particularly the lower retainer ring is one-piece with the bottom part and/or the higher retainer ring is one-piece with the top part. The lower axial end of the spring bellow may be retained, particularly press fitted, between the lower retainer ring and the bottom part. The higher axial end of the spring bellow may be retained, particularly press fitted, between the higher retainer ring and the top part. Additional parts for providing a secure connection of the spring bellow to the bottom part and/or to the top part may be omitted. The low number of assembling parts facilitates the assembling process and leads to low manufacturing costs.

Preferably the lower axial end of the spring bellow terminates at a smaller average diameter than the higher axial end, wherein the bottom part provides a contact area over which a lower part of the spring bellow unrolls during an elastic compression of the spring bellow or the higher axial end of the spring bellow terminates at a smaller average diameter than the lower axial end, wherein the top part provides a contact area over which a higher part of the spring bellow unrolls during an elastic compression of the spring bellow. Since the average diameter of the spring bellow at its end, where the spring bellow unrolls along the provided contact area, it may be safeguarded that the spring bellow only bends radially outwards. A blocking of the spring bellow due to a part bended radially inwards in a radial direction is prevented.

Particularly preferred an outer diameter of a contact area, onto which the spring bellow unrolls when being compressed, is continuously increasing during a movement of the piston from a minimum inserted position of the piston pipe in the cylinder housing towards a maximum inserted position of the piston pipe in the cylinder housing. The design of the spring bellow as well as the design of the connection of the spring bellow with the top part and the design of the spring bellow which may contact the bottom part between the minimum inserted position of the piston pipe in the cylinder housing towards and the maximum inserted position of the piston pipe in the cylinder housing may be suitably chosen such that the outer diameter of the contact area is continuously increases during a movement of the piston from the minimum inserted position of the piston pipe in the cylinder housing towards the maximum inserted position of the piston pipe in the cylinder housing. The design of the spring bellow as well as the design of the connection of the spring bellow with the top part and the design of the spring bellow which may contact the bottom part between the minimum inserted position of the piston pipe in the cylinder housing towards and the maximum inserted position of the piston pipe in the cylinder housing may be suitably chosen such that the material of the spring bellow may roll over the bottom part radially outwards due to its elastic deformation during a movement of the piston from the minimum inserted position of the piston pipe in the cylinder housing towards the maximum inserted position of the piston pipe in the cylinder housing. When the spring bellow is compressed between the top part and the bottom part the contact area may wander radially outwards and/or increases radially outwards so that the outer diameter of the contact area is continuously increasing during the movement of the piston from the minimum inserted position towards the maximum inserted position. The spring bellow may abuts the part with the rolling contact, particularly the bottom part, in the minimum inserted position or only after a point when the piston pipe is already pressed over a predefined minimum height into the cylinder housing. After the spring bellow contacts the respective part and provides a contact area a further movement of the piston pipe into the cylinder housing towards the maximum inserted position leads to a continuously but not a step-wise increase of the outer diameter of the contact area.

Particularly a tangent to an accessible outer surface of the spring bellow in a point at the outer diameter of a contact area, onto which the spring bellow unrolls when being compressed, in the minimum inserted position of the piston pipe in the cylinder housing is inclined to the longitudinal direction by an angle $\alpha$, wherein $10° \leq \alpha \leq 90°$, particularly $30° \leq \alpha \leq 80°$, preferably $45° \leq \alpha \leq 75°$ and particularly preferred $60° \leq \alpha \leq 70°$ applies. The outer surface of the spring bellow is a surface pointing away from the piston pipe, particularly with an amount radially outwards. The accessible outer surface of the spring bellow is a part of the outer surface of the spring bellow, which is not in direct contact with another part of the dispenser pump, like the bottom part, and therefore accessible from outside the spring bellow. Due to the inclination of the tangent the spring bellow will naturally roll over the bottom part when the piston pipe is moved towards the maximum inserted position. This leads to a natural behavior of the spring bellow of bending radially outwards when elastically compressed.

Preferably the spring bellow comprises a cross sectional area in radial view which is mainly shaped like a part of circle in the minimum inserted position of the piston pipe in the cylinder housing, wherein particularly a maximum diameter of the spring bellow is located between the connection of the spring bellow with the top part and the contact area of the spring bellow on the bottom part in the minimum inserted position of the piston pipe in the cylinder housing. The spring bellow may be formed like a part of a hollow mainly spherical ball. In the minimum inserted position when mainly no compression force is applied the spring bellow may be formed in a convex manner. The risk of a bending of the spring bellow radially inwards can be reduced or even prevented. If so, the spring bellow may be formed like a part of an oval hollow body, particularly mainly egg-shaped.

Particularly preferred the spring bellow is connected to the one part at a diameter $d_t$ and contacts the other part at an outer diameter $d_{c,min}$ of a contact area, onto which the spring bellow unrolls when being compressed, in the minimum inserted position of the piston pipe in the cylinder housing, wherein $1.0 < d_t/d_{c,min} \leq 6.0$, particularly $1.5 \leq d_t/d_{c,min} \leq 5.0$, preferably $2.0 \leq d_t/d_{c,min} \leq 4.0$ and particularly preferred $2.5 \leq d_t/d_{c,min} \leq 3.0$ applies. Particularly at the top part the diameter of the spring bellow may be significantly larger than at the bottom part in the minimum inserted position. Therefore, the spring bellow can roll over a significant distance in radial direction when compressed. This ensures a bending of the spring bellow radially outwards and low friction effects as well as a low increasing spring force at the same time.

Particularly the spring bellow is connected to the one part at a diameter $d_t$ and contacts the other part at an outer diameter $d_{c,max}$ of a contact area, onto which the spring bellow unrolls when being compressed, in the maximum inserted position of the piston pipe in the cylinder housing, wherein $0.3 < d_t/d_{c,max} \leq 1.5$, particularly $0.5 < d_t/d_{c,max} \leq 1.0$, preferably $0.6 < d_t/d_{c,max} \leq 0.9$ and particularly preferred $0.7 < d_t/d_{c,max} \leq 0.8$ applies. The spring bellow can roll over a significant distance in radial direction when compressed. The spring bellow may even roll over a distance that the outer diameter of the contact area is particularly larger than the top diameter of the spring bellow at the top part. This ensures a bending of the spring bellow radially outwards and low friction effects as well as a low increasing spring force at the same time.

Particularly the spring bellow comprises a higher wall thickness between the lower retainer ring and the bottom part and/or between the higher retainer ring and the top part. A damage of the spring bellow when inserting the retainer ring into the connection opening of the spring bellow may be prevented due to the increased wall thickness.

Preferably the spring bellow is connected with the lower retainer ring and/or with the higher retainer ring by 2-component injection or insertion molding. The retainer ring and the spring bellow may be made from a plastic material so that the spring bellow may be connected to the guiding sleeve during the molding process for manufacturing the spring bellow. The connection of the retainer ring with the spring bellow may be provided in a common manufacturing step when producing the spring bellow. The number of manufacturing steps may be reduced leading to reduced manufacturing costs.

Particularly preferred the bottom part changes its extension in radial direction in dependence of its height in longitudinal direction, wherein particularly the bottom part is shaped mainly conical or mainly spherical. Preferably the bottom part borders a volume opened in a direction pointing away from the top part. The part which is in rolling contact to the spring bellow via the contact area does not have to be a flat and even plane. The bottom part may be formed for being adapted to the natural elastic deformation behavior of the spring bellow. The lower axial end of the spring bellow may try to evade downwards away from the top part when compressed. The bottom part may be adapted to this natural elastic deformation behavior of the spring bellow, particularly by its conical or mainly spherical shape, so that a relative movement of a part of the spring bellow with respect to the bottom part may be reduced or even mainly eliminated. Friction effects between the spring bellow and the bottom part when the spring bellow rolls over the bottom part may be minimized. Further it is possible reducing an increase of the spring force provided by the compressed spring bellow. In the alternate the top part changes its extension in radial direction in dependence of its height in longitudinal direction, wherein particularly the top part is shaped mainly conical or mainly spherical, as described with reference to the bottom part.

In a preferred embodiment the bottom part or the top part provides a contact area, onto which the spring bellow unrolls when being compressed, wherein the contact area comprises partially a convex course and partially a concave course. The course of contact area may be generally S-shaped in cross sectional view. When the spring bellow unrolls onto the bottom part, particularly the contact area is first convex and subsequent concave in a direction pointing downwards. When the spring bellow unrolls onto the top part, particularly the contact area is first convex and subsequent concave in a direction pointing upwards. The convex part of the contact area facilitates an unrolling of the spring bellow onto the contact area, wherein the concave part of the contact area may provide an increasing resistance against a further compression of the spring bellow. A hard hit of the piston pipe inside the cylinder housing when reaching the maximum inserted position may be prevented.

Preferably the bottom part forms a guiding collar. The guiding collar may abut a part of the bottle, particularly an upper part of the bottle so that the dispenser head may be connected with the bottle in a predefined relative position in vertical direction. Due to the abutting guiding collar the dip tube may be positioned a defined place inside the bottle, particularly in a groove provided at a bottom of the bottle. The guiding collar may protrude from the bottom part and/or may be positioned radially spaced to the cylinder housing.

Particularly a connecting collar for connecting the dispenser pump with a bottle is provided, wherein the connecting collar protrudes from the bottom part radially spaced to the cylinder housing, wherein particularly the bottom part overlap in radial view the connecting collar at least partially, preferably totally. For instance the connecting collar comprises a thread for screwing the dispenser pump to the bottle. Particularly the connecting collar comprises an inner thread to be screwed to an outer thread of a bottleneck of the bottle. The bottle particularly comprises the reservoir filled with the liquid to be dispensed via the dispenser pump. A secure connection of the dispenser pump with the bottle may be provided. The three-dimensional shape of the bottom part may be chosen such that the bottom part may at least partially encompass and/or cover the connecting collar. A protruding bottom part may be prevented so that a compact design of the dispenser pump with a low building space is possible. The three-dimensional form of the bottom part may be incorporated into the design of a dispenser for improving the outer appearance of the dispenser comprising such kind of a dispenser pump.

Preferably the spring bellow is made from an elastomeric material, particularly TPE, TPU or TPV. Such kind of material may provide a sufficient elasticity for providing a suitable spring characteristic for the spring bellow. A suitable material for the spring bellow is particularly selected from a group comprising, particularly essentially consisting of TPE-O or TPO (Thermoplastic Elastomer based on polyolefines, PP/EPDM), TPE-V or TPV (Polymerized thermoplastic Elastomer based on olefins, PP/EPDM), TPE-U or TPU (Thermoplastic Elastomer based on urethanes), TPE-S or TPS (Styrol-Block copolymers like SBS, SEBS, SEPS, SEEPS or MBS), TPE-A or TPA (Thermoplastic Copolyamide), Silicone, natural rubber and synthetic, particularly vulcanized, rubber like Styrol-Butadien-Rubber, Chloropren-Rubber (CR), Butadien-Rubber (BR), Acrylnitril-Butadien-Rubber (NBR), Butyl Rubber (IIR), Ethylen-Propylen-Dien-Rubber (EPDM) or Polyisopren-Rubber (IR).

Particularly preferred the piston pipe comprises an outlet valve, particularly a one-way valve, for feeding the dispenser head, wherein particularly the top part is located between the outlet valve of the piston pipe and the cylinder housing. The outlet valve may define an upper end of the piston volume inside the piston pipe. Due to the outlet valve a necessary minimum pressure inside the piston pipe may be defined so that the risk of an unintended dispensing of the liquid is reduced. If so, the outlet valve may be positioned lower with respect to the top part. The dispenser head may be inserted into the top part for communication with the outlet valve. The dispenser head may be connected, particularly be screwing, with the piston pipe and/or the top part.

Particularly a dispenser head or a mixing bowl is releasably connected with the connecting area of the piston pipe. Due to the releasable connection an exchange of the dispenser head or the mixing bowl is facilitated. For instance the piston pipe and/or the top part comprises a thread for screwing and unscrewing the dispenser head or the mixing bowl. The head part may form a nozzle for dispensing the fluid into the environment.

Preferably the dip tube is connected to a housing volume of the cylinder housing via an inlet valve, particularly a one-way valve, wherein the piston pipe comprises an inner piston volume communicating with the housing volume via a connecting valve, particularly a one-way valve. When a negative pressure applies inside the housing volume of the cylinder housing fluid may be sucked in from the reservoir or the dip tube into the housing volume via the inlet valve, wherein the connecting valve is closed. When the piston pipe is pushed into the cylinder housing the inlet valve closes so that the fluid inside the housing volume can be pressed through the connecting valve towards the dispenser head via the piston volume of the piston pipe. Particularly the piston volume is filled with the pumped fluid, wherein after a further stroke of the dispenser pump the further pumped fluid displaces the prior pumped fluid inside the piston volume towards the dispenser head, where the fluid can be dispensed and applied.

Particularly preferred the housing volume comprises a diameter $d_C$ orthogonal to the longitudinal direction, wherein the piston volume comprises a diameter $d_P$ orthogonal to the longitudinal direction, wherein $0.80 \le d_P/d_C < 1.00$, particularly $0.85 \le d_P/d_C \le 0.99$, preferably $0.90 \le d_P/d_C \le 0.98$ and most preferred $0.95 \le d_P/d_C \le 0.97$ applies. Particularly the diameter $d_P$ of the piston volume is only smaller with respect to the diameter $d_C$ of the housing volume due to the necessary wall thickness of the piston pipe. The piston pipe may be made from a quite less amount of material reducing the material costs and the manufacturing costs.

Particularly the housing volume comprises a volume $V_C$, wherein the piston volume comprises a volume $V_P$, wherein $0.70 \leq V_P/V_C < 1.30$, particularly $0.80 \leq V_P/V_C < 1.20$, preferably $0.90 \leq V_P/V_C < 1.10$ and most preferred $V_P/V_C = 1.00 \pm 0.05$ applies. The housing volume $V_C$ is measured in the minimum inserted position of the piston pipe and is axially bordered by the piston pipe and a front face opposite to the piston pipe. The piston volume $V_P$ is axially bordered by a front face pointing to the cylinder housing and an opposing front face and/or the level of the top part. When the housing volume corresponds mainly to the piston volume the piston volume can be mainly completely filled with the fluid filling the housing volume so that after a further pushing of the piston pipe in the cylinder housing immediately fluid can be dispensed via the dispenser head. The housing volume and the piston volume may differ slightly for instance for compensating a further volume inside the dispenser head and/or for providing an intended residual volume inside the piston volume compared to the housing volume. Due to the residual volume the piston pipe has to be pushed via a minimum distance against the spring force of the spring bellow before the liquid inside the piston volume is dispensed so that the risk of an unintended dispensing of the liquid is reduced.

Preferably the cylinder housing, the bottom part and particularly the stop and/or the connecting collar are one-piece and/or the piston pipe, the top part and the connecting area are one-piece. Particularly the dispenser pump may consist of three assembling units, wherein besides sealings and valves only three separate parts of the piston pump may be present. The low number of different parts facilitates the mounting of the dispenser pump and leads to reduced manufacturing costs.

A further aspect of the invention is directed to a dispenser for dispensing a fluid, comprising a bottle comprising a reservoir at least partially filled with the fluid and a dispenser pump which may be designed as previously described for pumping a fluid from the reservoir to a dispenser head, wherein the dispenser pump is connected to the bottle. The retainer ring of the dispenser pump enables a fast, easy and secure connection of the spring bellow at low mounting costs and without the need of further connection means so that a cost efficient manufacturing of a dispenser with a high life time is enabled which may be particularly used for applying cosmetic products like hair care products. Due to a kind of rolling movement of the spring bellow particularly over the bottom part the spring bellow does not block a further movement of the piston pipe towards the maximum inserted position by a significantly increasing spring force but may elastically evade so that the spring force provided by the spring bellow increases only slightly, if so at all, during the movement of the piston pipe towards the maximum inserted position.

A further aspect of the invention is directed to a method for operating a dispenser pump which may be designed as previously described and/or a dispenser which may be designed as previously described wherein the spring bellow unrolls continuously along a contact area of the bottom part or the top part during a movement of the piston from a minimum inserted position of the piston pipe in the cylinder housing towards a maximum inserted position of the piston pipe in the cylinder housing. The method can be further designed as previously described with respect to the dispenser pump and/or the dispenser. The retainer ring enables a fast, easy and secure connection of the spring bellow at low mounting costs and without the need of further connection means so that a cost efficient manufacturing of a dispenser with a high life time is enabled which may be particularly used for applying cosmetic products like hair care products. Due to a kind of rolling movement of the spring bellow particularly over the bottom part the spring bellow does not block a further movement of the piston pipe towards the maximum inserted position by a significantly increasing spring force but may elastically evade so that the spring force provided by the spring bellow increases only slightly, if so at all, during the movement of the piston pipe towards the maximum inserted position.

BRIEF DESCRIPTION OF THE DRAWINGS

These and other aspects of the invention will be apparent from and elucidated with reference to the embodiments described hereinafter, wherein the described features can constitute each solely or in combination an independent aspect of the invention. In the drawings.

DETAIL DESCRIPTION OF THE INVENTION

Figure 1:
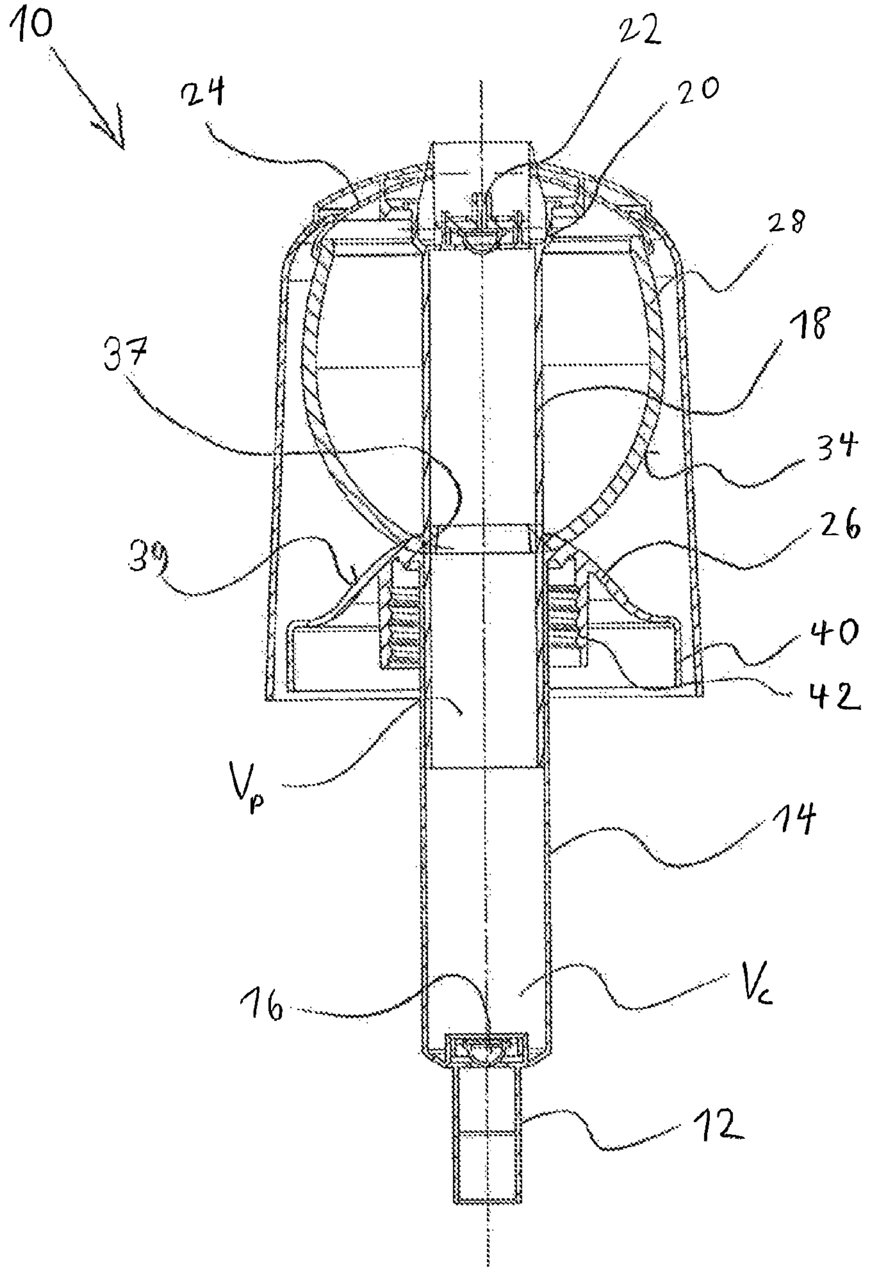
FIG. 1: shows a sectional side view of a first embodiment of a dispenser pump in a minimum inserted position.

The dispenser pump 10 illustrated in FIG. 1 comprises a dip tube 12 which may reach into a reservoir of a bottle filled with a fluid to be dispensed. The dip tube 12 communicates with a housing volume $V_C$ of a cylinder housing 14 via an inlet valve 16 which is designed as a one-way-valve. The cylinder housing 14 guides a piston pipe 18 in longitudinal direction. The piston pipe 18 comprises a piston volume $V_P$ communicating with the housing volume $V_C$ via a not illustrated connecting valve which is designed as a one-way-valve. The piston pipe 18 comprises a connecting area 20 by which a dispenser head or another part may be releasably connected to the piston pipe. An outlet valve 22 is positioned radially inside the connecting area 20, wherein the outlet valve 22 is designed as a one-way-valve for defining a minimum pressure inside the piston volume $V_P$ for the dispensed fluid. A fluid sucked in via the inlet valve 16 into the housing volume $V_C$ may be pressed into the a piston volume $V_P$ and displaced upwards by a further pumped amount of fluid via the outlet valve 22 to the dispenser head.

The piston pipe 18 may be connected to or being one-piece with a top part 24, wherein the cylinder housing 14 may be connected to or being one-piece with a bottom part 26. A spring bellow 28 may be fixed with the top part 24 or being adapted to abut the top part 24 after a predefined insertion of the piston pipe 18 into the cylinder housing 14. The top part 24 comprises a mainly tubular cover part 25 covering the whole spring bellow 28 in the illustrated minimum inserted position of the piston pipe 18 into the cylinder housing 14. The spring bellow 28 is fixed to the bottom part 26. When the piston pipe 18 is pushed into the cylinder housing 14 the spring bellow 28 may provide an increasing spring force for pushing the piston pipe 18 back into the minimum inserted position.

A connecting collar 42 is provided which protrudes vertically downwards from the bottom part 26. The dispenser pump 10 may be connected to a bottle via the connecting collar 42 for instance by a screw connection. If so, a guiding collar 40 protruding from the bottom part 26 downwards may be provided. The guiding collar 40 may abut a part of the bottle for defining a relative position of the cylinder housing 14 and the dip tube 12 inside the bottle.

The spring bellow 28 is made from a thermoplastic Elastomer ("TPE") and designed as a part of mainly spherical body, particularly mainly egg-shaped, in the minimum inserted position of the piston pipe 18 in the cylinder housing 14, wherein the material of the spring bellow 28 may bend radially outwards in the maximum inserted position of the piston pipe 18 in the cylinder housing 14. The spring bellow comprises an outer surface 34 pointing radially outwards. In the absence of the cover part 25 the outer surface 34 would be accessible for a user over mainly the whole heights in longitudinal direction between the top part 24 and the bottom part 26.

Figure 2:
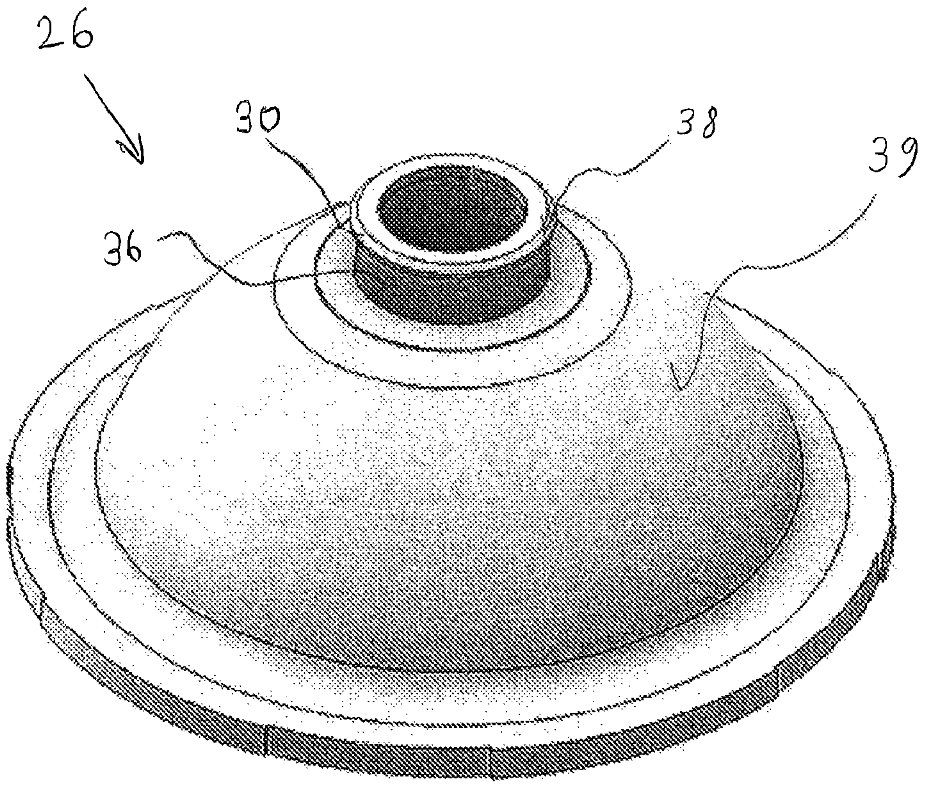
FIG. 2: shows a perspective view of a bottom part for the dispenser pump of FIG. 1, FIG. 3: shows a sectional side view of a second embodiment of a dispenser in a minimum inserted position.

As illustrated in FIG. 2 the bottom part 26 may comprise a lower retainer ring 30 protruding radially outwards at the most upper end of the bottom part. The spring bellow 28 is retained between the retainer ring 30 and an outer contact area 39 of the bottom part 26. The lower retainer ring 30 is positioned inside the spring bellow 28. In order to facilitate the insertion of the lower retainer ring 30 into the spring bellow 28, the lower retainer ring 30 may comprise a chamfer 38. The contact area 39 may be convex close to the lower retainer ring 30 and concave at its radial outer end away from the contact area 39.

Figure 3:
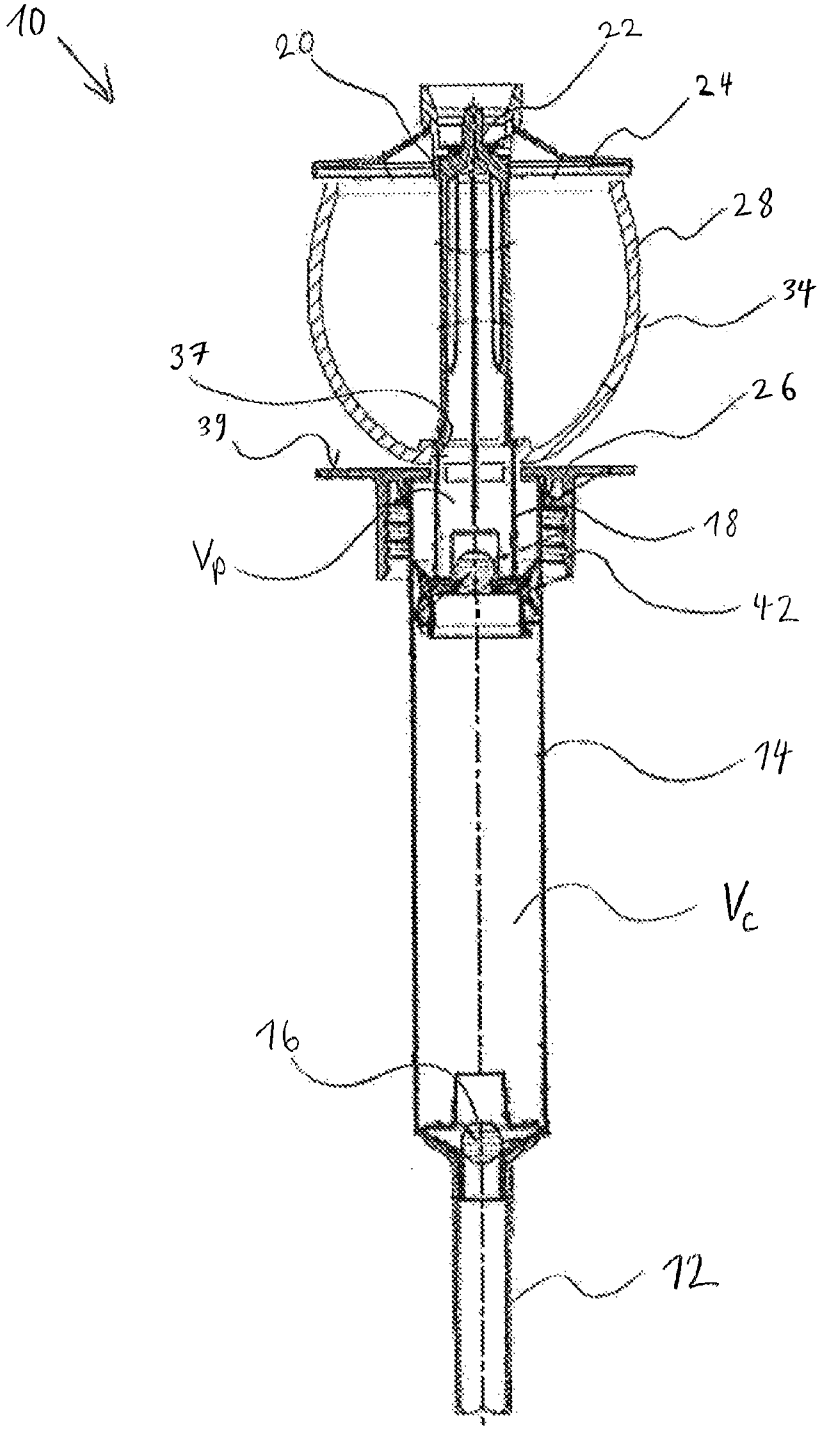

In the embodiment illustrated in FIG. 3 the spring bellow 28 is formed compared to the embodiment illustrated in FIG. 1 like a part of a mainly spherical elastic ball. The lower axial end of the spring bellow 28 comprises a connection opening 37 into which a sleeve part 36 of the bottom part 26 is inserted for guiding the piston pipe 18 and providing the lower retainer ring 30 inside the spring bellow 26. When the piston pipe 18 is pushed from the illustrated minimum inserted position towards the maximum inserted position into the cylinder housing 14 the spring bellow 28 is compressed between the top part 24 and the bottom part 26 for providing a spring force to push the piston pipe 18 back in its minimal inserted position. The spring bellow 28 may roll over the contact area 39 of the bottom part 26 during the movement of the piston pipe 18 into the cylinder housing 14 when the spring bellow 28 is elastically deformed. The spring bellow 28 contacts the bottom part 26 via the contact area 39, wherein an outer diameter of the contact area 39 wanders radially outwards during at least a part of the movement of the piston pipe 18 from the minimum inserted position towards the maximum inserted position. Due to this elastic behavior of the spring bellow 28 it is safeguarded that the spring bellow 28 bends radially outwards but not radially inwards when elastically compressed.

Figure 4:
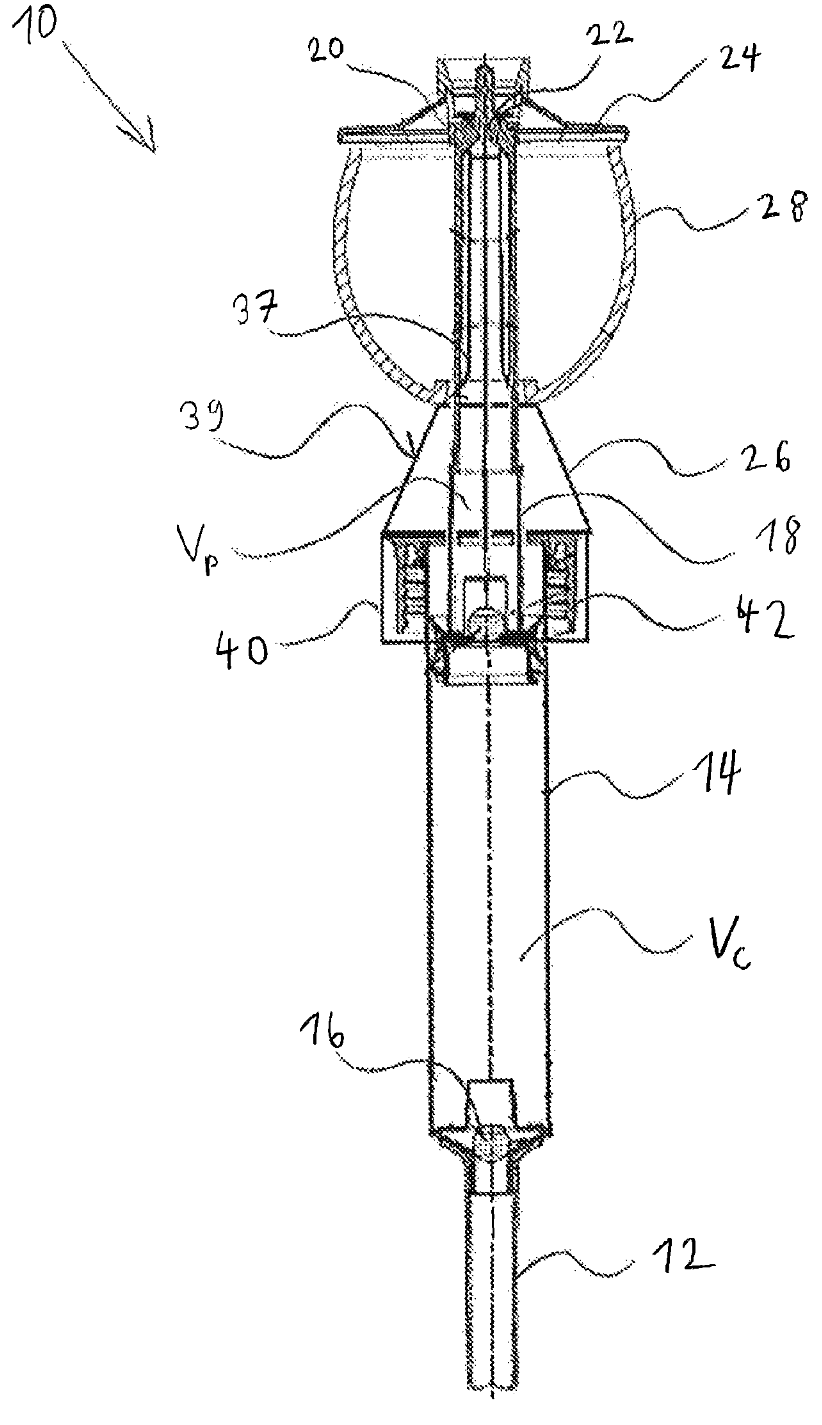
FIG. 4: shows a sectional side view of a third embodiment of a dispenser pump in a minimum inserted position

In the embodiment illustrated in FIG. 4 the bottom part 26 is formed compared to the embodiment illustrated in FIG. 3 not flat but mainly conical, particularly like a truncated cone. The spring bellow 28 may not only roll over the bottom part 26 radially outwards but also downwards away from the top part 24 during the movement of the piston pipe 18 into the cylinder housing 14 when the spring bellow 28 is elastically deformed. The increase of the spring force provided by the compressed spring bellow 28 can be reduced so that the necessary force for displacing the piston pipe 18 does not significantly increase.

Figure 5:
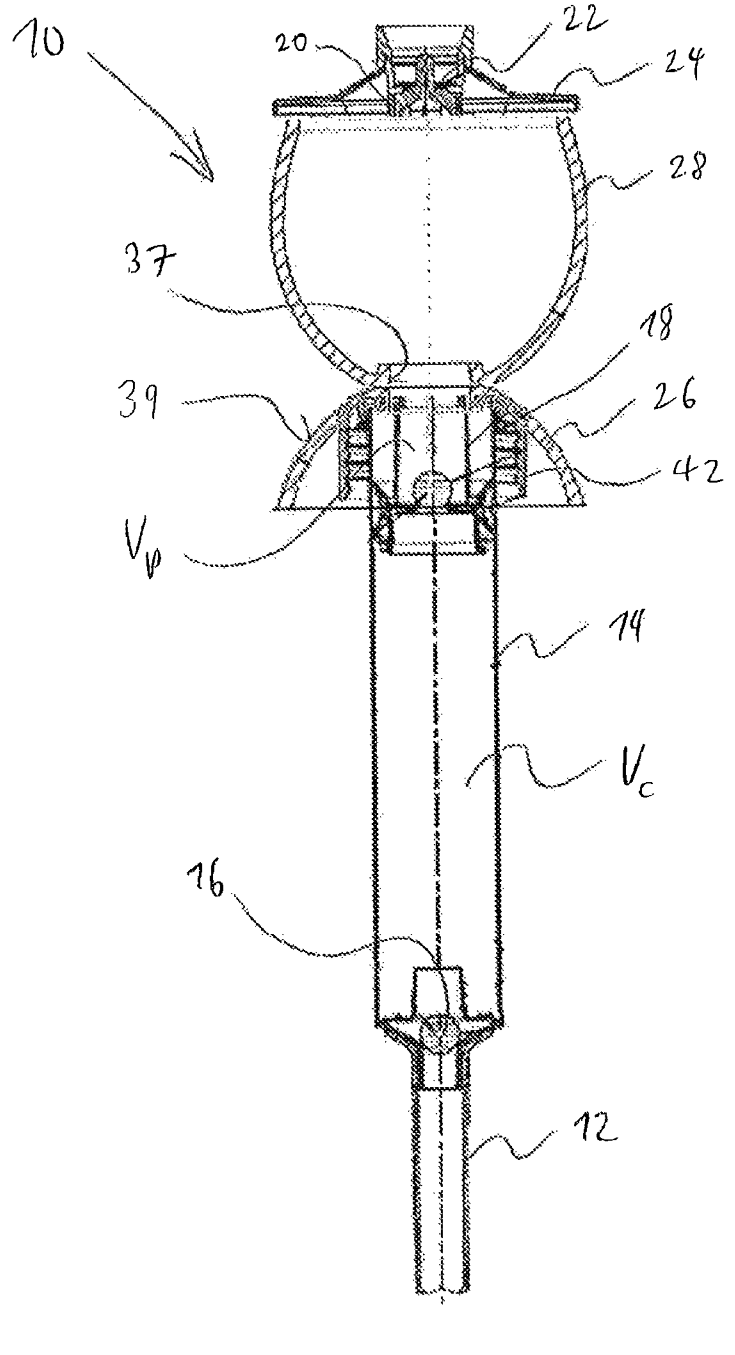
FIG. 5: shows a sectional side view of a forth embodiment of a dispenser pump in a minimum inserted position.

In the embodiment illustrated in FIG. 5 the bottom part 26 is formed compared to the embodiment illustrated in FIG. 4 not conical but mainly spherical particularly like an umbrella. The three-dimensional form of the bottom part 26 may be adapted to the natural elastic deformation behavior of the spring bellow 28. At the same time the bottom part 26 may form the guiding collar 40 so that the bottom part 26 and the guiding collar 40 may be provided by the same piece. The bottom part 26 may perform the function of the guiding collar 40 of abutting the bottle and thus limiting the distance by which the dispenser pump 10 may be screwed to the bottle via the connecting collar 42.

What is claimed is:

1. A dispenser pump adapted for pumping a fluid from a reservoir to a dispenser head, comprising a dip tube adapted for being inserted into the fluid located inside the reservoir, a cylinder housing connected with the dip tube, a piston pipe guided in longitudinal direction by the cylinder housing for pumping the fluid from the dip tube via the cylinder housing to the dispenser head, wherein the piston pipe comprises a connecting area for connecting the dispenser head to the piston pipe, a top part connected with the piston pipe, a bottom part connected with the cylinder housing and a spring bellow adapted for pushing the piston pipe in a direction outwards the cylinder housing, wherein the spring bellow comprising a lower axial end connected to a higher axial end via an intermediate portion of the spring bellow and the spring bellow is elastically compressible and provides a spring force on the piston pipe such that the spring force provided by the spring bellow presses the piston pipe out of the cylinder housing toward a minimum inserted position of the piston pipe in the cylinder housing, wherein the lower axial end of the spring bellow is connected with the bottom part via a lower retainer ring located inside the spring bellow and the higher axial end of the spring bellow is connected with the top part via a higher retainer ring located inside the spring bellow, and wherein the lower retainer ring has an undercut comprising a retainer surface pointing and facing away from the intermediate portion of the spring bellow, wherein the retainer surface of the undercut of the retainer rind blocks an axial movement of the spring bellow back into a detached position.

2. The dispenser pump according to claim 1 wherein at least one of the lower retainer ring is one-piece with the bottom part and the higher retainer ring is one-piece with the top part.

3. The dispenser pump according to claim 1 wherein the lower axial end of the spring bellow terminates at a smaller average diameter than the higher axial end, wherein the bottom part provides a contact area over which a lower part of the spring bellow unrolls during an elastic compression of the spring bellow or the higher axial end of the spring bellow terminates at a smaller average diameter than the lower axial end, wherein the top part provides a contact area over which a higher part of the spring bellow unrolls during an elastic compression of the spring bellow.

4. The dispenser pump according to claim 1 wherein an outer diameter of a contact area, onto which the spring bellow unrolls when being compressed, is continuously increasing during a movement of the piston from the minimum inserted position of the piston pipe in the cylinder housing towards a maximum inserted position of the piston pipe in the cylinder housing.

5. The dispenser pump according to claim 1 wherein a tangent to an accessible outer surface of the spring bellow in a point at the outer diameter of a contact area, onto which the spring bellow unrolls when being compressed, in the minimum inserted position of the piston pipe in the cylinder housing is inclined to the longitudinal direction by an angle $\alpha$, wherein $10° \leq \alpha \leq 90°$ applies.

6. The dispenser pump according to claim 1 wherein the spring bellow comprises a cross sectional area in radial view which is mainly shaped like a part of circle in the minimum inserted position of the piston pipe in the cylinder housing, wherein a maximum diameter of the spring bellow is located between the connection of the spring bellow with the top part and the contact area of the spring bellow on the bottom part in the minimum inserted position of the piston pipe in the cylinder housing.

7. The pump according to claim 1 wherein the spring bellow is connected to the top part at a diameter $d_t$ and contacts the bottom part at a minimum outer diameter $d_{c,min}$ of a contact area, onto which the spring bellow unrolls when being compressed, in the minimum inserted position of the piston pipe in the cylinder housing or the spring bellow is connected to the bottom part at the diameter $d_t$ and contacts the top part at the minimum outer diameter $d_{c,min}$ of the contact area, wherein the ratio of the diameter $d_t$ to the minimum outer diameter $d_{c,min}$ ($d_t/d_{c,min}$) is greater than 1.0 and less than or equal to 6.0.

8. The dispenser pump according to claim 1 wherein the spring bellow is connected to the top part at a diameter $d_t$ and contacts the bottom part at a maximum outer diameter $d_{c,max}$ of a contact area, onto which the spring bellow unrolls when being compressed, in the maximum inserted position of the piston pipe in the cylinder housing or the spring bellow is connected to the bottom part at the diameter $d_t$ and contacts the top part at the maximum outer diameter $d_{c,max}$ of the contact area, wherein the ratio of the diameter $d_t$ to the maximum outer diameter $d_{c,max}$ ($d_t/d_{c,max}$) is greater than 0.3 and less than or equal to 1.5.

9. The dispenser pump according to claim 1 wherein the spring bellow comprises a higher wall thickness between at least one selected from the lower retainer ring and the bottom part and the higher retainer ring and the top part.

10. The dispenser pump according to claim 1 wherein the spring bellow is connected, by 2-component injection or insertion molding, with at least one selected from the lower retainer ring and the higher retainer ring.

11. A dispenser pump adapted for pumping a fluid from a reservoir to a dispenser head, comprising

- a dip tube for being inserted into the fluid located inside the reservoir,
- a cylinder housing connected with the dip tube,
- a piston pipe guided in longitudinal direction by the cylinder housing for pumping the fluid from the dip tube via the cylinder housing to the dispenser head, wherein the piston pipe comprises a connecting area for connecting the dispenser head to the piston pipe,
- a top part connected with the piston pipe,
- a bottom part connected with the cylinder housing and
- a spring bellow for pushing the piston pipe in a direction outwards the cylinder housing, wherein the spring bellow is elastically compressible and provides a spring force on the piston pipe such that the spring force provided by the spring bellow presses the piston pipe out of the cylinder housing toward a minimum inserted position of the piston pipe in the cylinder housing,
- wherein at least one of a lower axial end of the spring bellow is connected with the bottom part via a lower retainer ring located inside the spring bellow and a higher axial end of the spring bellow is connected with the top part via a higher retainer ring located inside the spring bellow, and
- wherein the bottom part changes its extension in radial direction in dependence of its height in longitudinal direction, wherein the bottom part is shaped at least partially mainly conical or mainly spherical.

12. A dispenser pump adapted for pumping a fluid from a reservoir to a dispenser head, comprising

- a dip tube for being inserted into the fluid located inside the reservoir,
- a cylinder housing connected with the dip tube,
- a piston pipe guided in longitudinal direction by the cylinder housing for pumping the fluid from the dip tube via the cylinder housing to the dispenser head, wherein the piston pipe comprises a connecting area for connecting the dispenser head to the piston pipe,
- a top part connected with the piston pipe,
- a bottom part connected with the cylinder housing and
- a spring bellow for pushing the piston pipe in a direction outwards the cylinder housing, wherein the spring bellow is elastically compressible and provides a spring force on the piston pipe such that the spring force provided by the spring bellow presses the piston pipe out of the cylinder housing toward a minimum inserted position of the piston pipe in the cylinder housing,
- wherein at least one of a lower axial end of the spring bellow is connected with the bottom part via a lower retainer ring located inside the spring bellow and a higher axial end of the spring bellow is connected with the top part via a higher retainer ring located inside the spring bellow, and
- wherein a connecting collar for connecting the dispenser pump with a bottle is provided, wherein the connecting collar protrudes from the bottom part radially spaced to the cylinder housing, wherein the bottom part overlap in radial view the connecting collar at least partially.

13. The dispenser pump according to claim 1 wherein a dispenser head or a mixing bowl is releasably connected with the connecting area of the piston pipe.

14. A dispenser adapted for dispensing a fluid, comprising:

- a bottle having a reservoir at least partially filled with the fluid; and
- the dispenser pump according to claim 1 connected to the bottle adapted for pumping a fluid from the reservoir to a dispenser head.

* * * * *